(12) United States Patent
Lipson et al.

(10) Patent No.: US 10,066,986 B2
(45) Date of Patent: Sep. 4, 2018

(54) LIGHT EMITTING SENSOR HAVING A PLURALITY OF SECONDARY LENSES OF A MOVEABLE CONTROL STRUCTURE FOR CONTROLLING THE PASSAGE OF LIGHT BETWEEN A PLURALITY OF LIGHT EMITTERS AND A PRIMARY LENS

(71) Applicant: GM GLOBAL TECHNOLOGY OPERATIONS LLC, Detroit, MI (US)

(72) Inventors: Ariel Lipson, Tel Aviv (IL); Itai Afek, Kfar Sava (IL); Michael Slutsky, Kfar Saba (IL)

(73) Assignee: GM Global Technology Operations LLC, Detroit, MI (US)

( * ) Notice: Subject to any disclaimer, the term of this patent is extended or adjusted under 35 U.S.C. 154(b) by 31 days.

(21) Appl. No.: 15/252,893

(22) Filed: Aug. 31, 2016

(65) Prior Publication Data

US 2018/0058923 A1    Mar. 1, 2018

(51) Int. Cl.
*G01J 1/04*    (2006.01)
(52) U.S. Cl.
CPC ............ *G01J 1/0448* (2013.01); *G01J 1/044* (2013.01); *G01J 1/0411* (2013.01)

(58) Field of Classification Search
CPC ............ G02B 26/0833; G02B 6/4234; G02B 26/127; G02B 27/0961; G02B 7/003; G01J 1/04; G01J 1/06; G01J 1/0411; G01J 1/0448; B23K 26/04; B23K 26/067
USPC .................................................. 250/205, 216
See application file for complete search history.

(56) References Cited

U.S. PATENT DOCUMENTS

| 7,214,916 B2 * | 5/2007 | Baumgart | F41G 7/2253 250/203.6 |
| 2004/0114224 A1 * | 6/2004 | Rigler | G01N 21/6428 359/383 |

* cited by examiner

*Primary Examiner* — Que T Le
(74) *Attorney, Agent, or Firm* — Quinn IP Law

(57) ABSTRACT

A light sensor includes a primary lens, and a light device spaced from the primary lens. A control structure is disposed between the primary lens and the light device. An actuator is coupled to the control structure to move the control structure relative to the primary lens and the light device to control the passage of light between the primary lens and the light device. The light sensor may include a light emitting sensor having an array of individual light emitters, or a light detecting sensor having a light detector. The control structure may include an array of secondary bi-telecentric lenses for use with the light emitting sensor, or a plate having an aperture extending therethrough for use with the light detecting sensor.

5 Claims, 3 Drawing Sheets

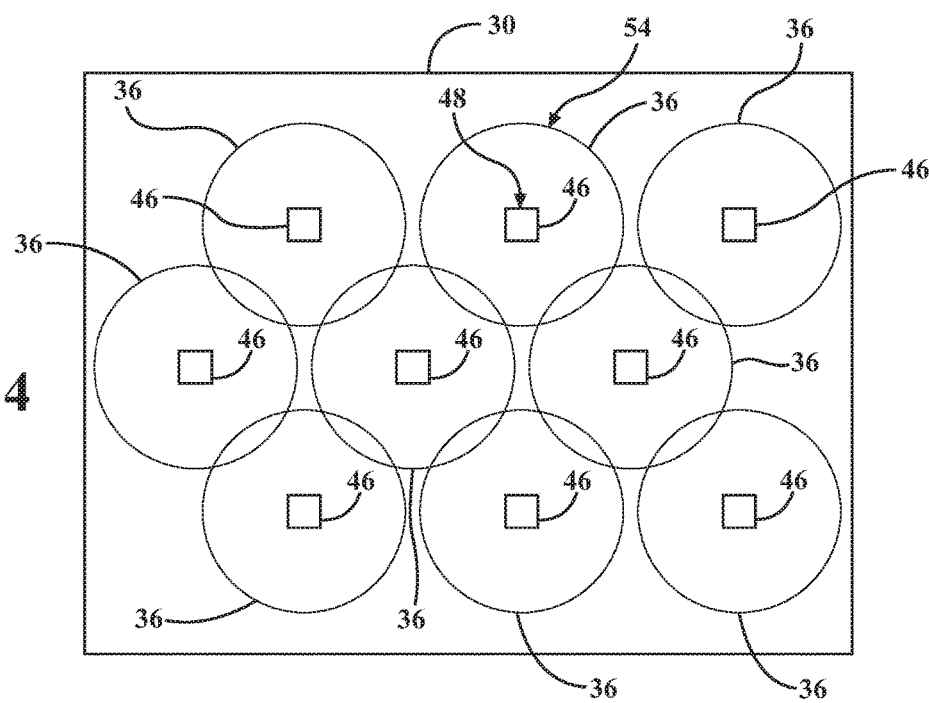
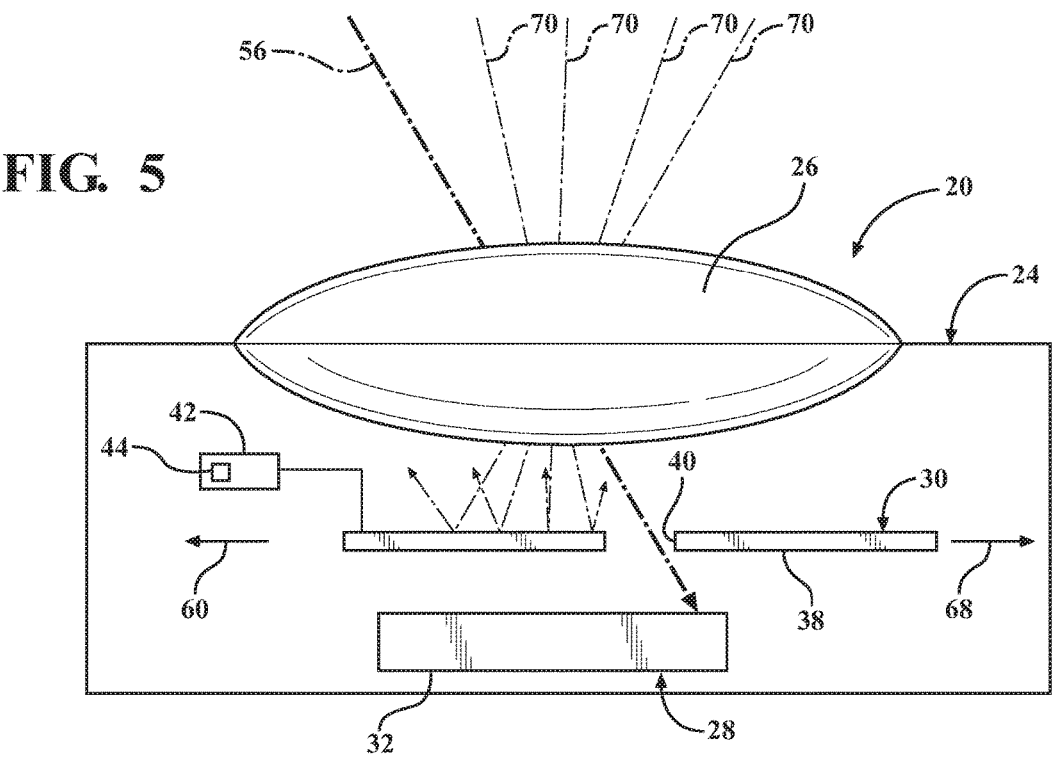

LIGHT EMITTING SENSOR HAVING A PLURALITY OF SECONDARY LENSES OF A MOVEABLE CONTROL STRUCTURE FOR CONTROLLING THE PASSAGE OF LIGHT BETWEEN A PLURALITY OF LIGHT EMITTERS AND A PRIMARY LENS

TECHNICAL FIELD

The disclosure generally relates to a light sensor, such as a light emitting sensor or a light detecting sensor.

BACKGROUND

Light sensors may include, but are not limited to, light emitting sensors that transmit light, or light detecting sensors that detect light. Light sensors may send and/or receive a beam a light for taking a measurement, such as measuring a distance. Light Detection and Ranging, often referred to as LIDAR, is just one example of a light sensor. LIDAR uses a light emitting sensor to transmit a laser light beam through a primary lens. The primary lens spreads the laser light beam across a field of view. A light detecting sensor detects the returning laser light beam that is reflected from a target. The LIDAR system calculates the distance to the target based on the time delay between the transmitted and the received laser light pulses.

The accuracy of the scan in part depends on the number of data points collected. Accordingly, LIDAR systems may include many lasers to generate a higher data point density or resolution, thereby providing increased accuracy. However, increasing the number of lasers increases the cost and complexity of the LIDAR system. Additionally, extraneous light on the light detecting sensor may reduce the accuracy of the scan. Accordingly, the light detecting sensor may filter or block out extraneous light, such as sunlight, to increase the accuracy of the measurement. In order to reduce the affect of extraneous light on the light detecting sensor, the light detecting sensor may include an array of individual light detectors, with each individual light detector having a small area of interest, instead of one light detector having a larger area of interest. However, increasing the number of light detectors increases the cost and complexity of the LIDAR system.

SUMMARY

A light sensor is provided. The light sensor includes a primary lens, and a light device spaced from the primary lens. A control structure is disposed between the primary lens and the light device. An actuator is coupled to the control structure. The actuator is operable to move the control structure relative to the primary lens and the light device to control the passage of light between the primary lens and the light device.

A light emitting sensor is also provided. The light emitting sensor includes a primary lens, and a plurality of individual light emitters arranged in an array. The array of the individual light emitters is arranged on a first plane. Each of the plurality of individual light emitters is operable to transmit a beam of light along a path that is perpendicular to the first plane. A control structure includes a plurality of secondary lenses, which are arranged in an array. The array of secondary lenses is arranged on a second plane that is disposed between the array of individual light emitters and the primary lens. The first plane and the second plane are parallel with each other. An actuator is coupled to the control structure. The actuator is operable to move the control structure relative to the primary lens and the plurality of individual light emitters. Movement of the control structure controls the passage of light between the plurality of light emitters and the primary lens.

A light detecting sensor is also provided. The light detecting sensor includes a primary lens, and a light detector spaced from the primary lens. A plate, having at least one aperture extending through the plate, is disposed between the primary lens and the light detector. An actuator is coupled to the plate. The actuator is operable to move the plate relative to the primary lens and the light detector to control the position of the at least one aperture relative to the light detector.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 4 is a schematic front plan view of the light emitting sensor showing the array of secondary lenses in the central position.

FIG. 5 is a schematic plan view of a light detecting sensor.

DETAILED DESCRIPTION

Figure 1:
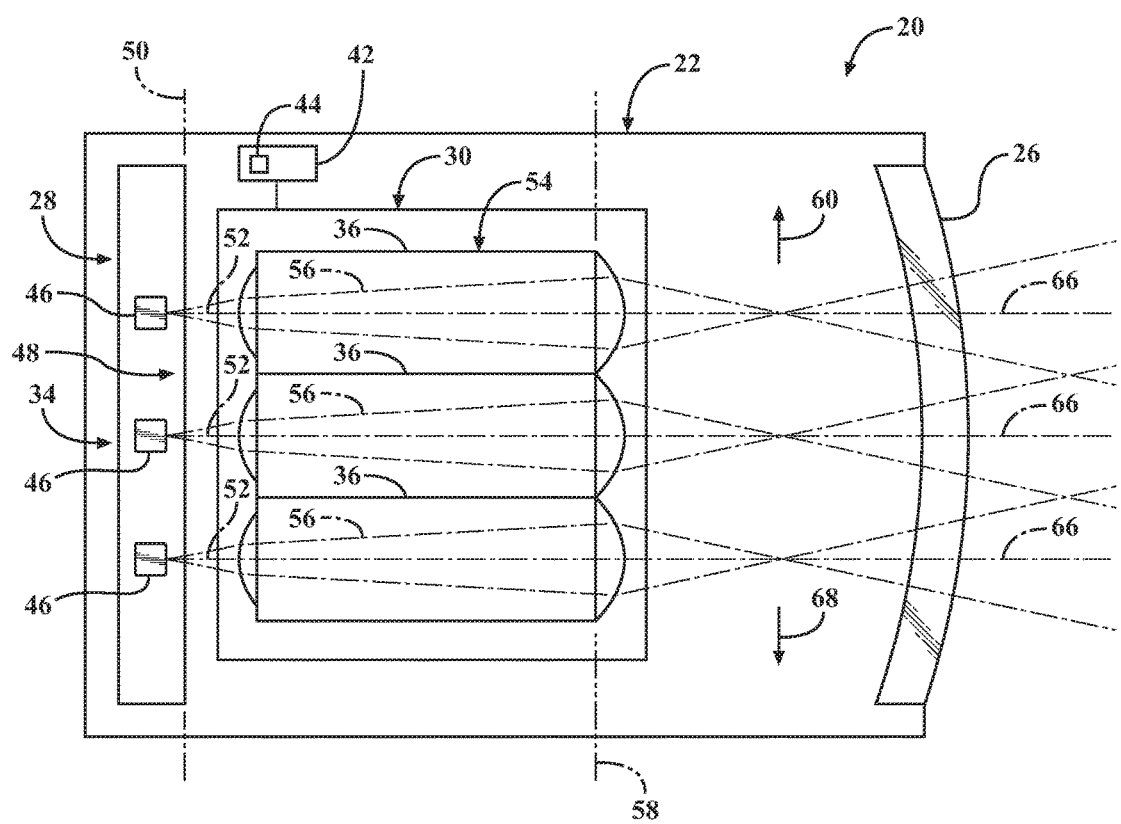
FIG. 1 is a schematic side plan view of a light emitting sensor showing an array of secondary lenses in a central position.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a light sensor is generally shown at 20. The light sensor 20 may include, but is not limited to, a light emitting sensor 22 (shown in FIGS. 1-4) or a light detecting sensor 24 (shown in FIG. 5). While the light sensor 20 is described herein as being either the light emitting sensor 22, or the light detecting sensor 24, it should be appreciated that the light sensor 20 may include some other sensor not shown or described herein.

The light sensor 20 includes a primary lens 26, a light device 28 spaced from the primary lens 26, and a control structure 30 disposed between the primary lens 26 and the light device 28. If the light sensor 20 is configured as the light emitting sensor 22, then the primary lens 26 spreads a plurality of light beams across a field of view. If the light sensor 20 is configured as the light detecting sensor 24, such as shown in FIG. 5, then the primary lens 26 collects the reflected light beams and directs them toward a light detector 32. The primary lens 26 may include any lens that is suitable for the intended use of the light sensor 20. The primary lens 26 may include a single lens, or multiple lens. The primary lens 26 may include, but is not limited to, any object that is operable to focus or otherwise modify the direction or movement of light. The primary lens 26 may be made of a single material with aspheric curvatures, or a combination of several materials and more than two surfaces. The primary lens 26 may also magnify or demagnify the light beam 56.

The light device 28 of the light sensor 20 may include, but is not limited to, one of a light emitter 34 or the light detector 32. For example, if the light sensor 20 is configured as the light emitting sensor 22, such as shown in FIGS. 1-4, then the light device 28 includes the light emitter 34, whereas if the light sensor 20 is configured as the light detecting sensor 24, such as shown in FIG. 5, then the light device 28 includes the light detector 32. The light emitter 34 may include any device capable of emitting, transmitting, or sending one or more beams of light. The light detector 32 may include any device capable of sensing one or more incoming beams of light.

The control structure 30 may include any device that is disposed between the light device 28 and the primary lens 26, which is used to control the transmission of light beams between the light device 28 and the primary lens 26. For example, if the light sensor 20 is configured as the light emitting sensor 22, such as shown in FIGS. 1-4, then the control structure 30 may include one or more secondary lenses 36, whereas if the light sensor 20 is configured as the light detecting sensor 24, such as shown in FIG. 5, then the control structure 30 may include a plate 38 having at least one aperture 40 extending through the plate 38.

The light sensor 20 further includes an actuator 42 that is coupled to the control structure 30. The actuator 42 is operable to move the control structure 30 relative to the primary lens 26 and the light device 28 to control the passage of light between the primary lens 26 and the light device 28. It should be appreciated that the primary lens 26 and the light device 28 do not move relative to each other, and that it is the control structure 30 that moves relative to both the primary lens 26 and the light device 28. Depending on the requirements of the light sensor 20, the actuator 42 may move the control structure 30 in one dimension, e.g., left and right along an x axis of a Cartesian coordinate system, two dimensions, e.g., left and right along an x axis as well as up and down along a y axis of a Cartesian coordinate system, or three dimension, e.g., left and right along an x axis, up and down along a y axis, as well as in forward and backward along a z axis of a Cartesian coordinate system. The actuator 42 may include, but is not limited to, one of a piezoelectric actuator 42, a shape memory alloy actuator 42, a shape memory polymer actuator 42, a magnetic actuator 42, an electronic actuator 42, or a hydraulic actuator 42.

Due to the size of many light sensors 20, it is contemplated that the actuator 42 may include a micro electromechanical system (MEMS) device 44. As is known in the art, the MEMS device 44 may be considered to include a class of systems that are physically small, having features with sizes in the micrometer range. The MEMS device 44 may have both electrical and mechanical components. MEMS devices 44 may be produced through micromachining processes. The term "micromachining" generally refers to the production of three-dimensional structures and moving parts through processes including modified integrated circuit (computer chip) fabrication techniques (such as chemical etching) and materials (such as silicon semiconductor material). MEMS devices 44 may be operated in conjunction with other MEMS (micromachined) components or may be used with standard sized (larger) components, such as those produced by mechanical machining processes.

The actuator 42 may be linked, attached or coupled to the control structure 30 in any suitable manner that allows the actuator 42 to move the control structure 30 as required for any given application. The specifics of how the actuator 42 is connected to and moves the control structure 30 are design specific, and are dependent upon the specific type of actuator 42 used and level of movement required for a specific application.

The exemplary embodiment of the light sensor 20 configured as the light emitting sensor 22 is described in greater detail below, with reference to FIGS. 1-4. As noted above, the light device 28 of the light emitting sensor 22 includes the light emitter 34. The light emitter 34 includes a plurality of individual light emitters 46 arranged in a light array 48. The light array 48 of individual light emitters 46 is disposed on a first plane 50. Each of the individual light emitters 46 is operable to transmit a beam of light along an original path 52 that is perpendicular to the first plane 50. As shown in FIG. 4, the exemplary embodiment of the light emitting sensor 22 includes nine individual light emitters 46 arranged in a three by three light array 48. However, it should be appreciated that the light emitting sensor 22 may include any number of individual light emitters 46, and be arranged in an array of any desirable configuration, depending upon the desired application. As noted above, the individual light emitters 46 may include, but are not limited to, one of a laser, an optical fiber, an optical waveguide, or a light emitting diode. Preferably, the individual light emitters 46 include a vertical-cavity surface-emitting laser, often referred to as a VCSEL. As is known in the art, the VCSEL is a type of semiconductor laser diode with laser beam emission perpendicular from the top surface.

The control structure 30 includes a plurality of secondary lenses 36 arranged in a lens array 54. The lens array 54 of secondary lenses 36 is disposed between the light array 48 of individual light emitters 46 and the primary lens 26. Each of the secondary lenses 36 is aligned with at least one respective individual light emitter 46 in the light array 48 for transmitting a respective light beam 56 from the respective individual light emitter 46 through the secondary lens 36 aligned therewith. While each secondary lens 36 is shown aligned with only one individual light emitter 46, it should be appreciated that each of the secondary lenses 36 may be aligned with more than one individual light emitter 46. For example, each secondary lens 36 may transmit light from two or three different individual light emitters 46. The lens array 54 of secondary lenses 36 is disposed on a second plane 58, with the first plane 50 and the second plane 58 being parallel with each other.

Each of the secondary lenses 36 is a bi-telecentric lens. As is known in the art, a bi-telecentric lens is a lens that is telecentric in both object space and image space. As such, the principal light beams 56 emitted from the individual light emitters 46 are parallel when entering the secondary lenses 36, as well as when exiting the secondary lenses 36. A bi-telecentric lens keeps the primary light beam 56 perpendicular both in the input and output of the primary lens 26. Keeping the primary light beam 56 perpendicular allows the design to act in an array format, since the output angle is independent of the position.

As noted above, the actuator 42 is coupled to the control structure 30, i.e., the lens array 54 of secondary lenses 36. The actuator 42 is operable to move the lens array 54 of secondary lenses 36 as a unit relative to the primary lens 26 and the plurality of individual light emitters 46. Moving the lens array 54 of secondary lenses 36 relative to the individual light emitters 46 and the primary lens 26 controls the passage of light between the plurality of light emitters 34 and the primary lens 26.

Referring to FIG. 1, the lens array 54 of secondary lenses 36 is shown in a central position. Each of the individual light emitters 46 is shown emitting a light beam 56 along a respective original path 52 that is perpendicular to the first plane 50 and the second plane 58. The respective original paths 52 of each individual light beam 56 are parallel with each other. Because the bi-telecentric secondary lenses 36 are centered with their respective individual light emitters 46, the bi-telecentric secondary lenses 36 transmit the individual light beams along the same original path 52, without altering the original path 52 or offsetting the individual light beams 56. As such, the individual light beams 56 entering the secondary lenses 36 along their respective original paths 52, which are perpendicular to the first plane 50 and the second plane 58 and parallel with each other, exit the secondary lenses 36 along their same respective original paths 52, which are perpendicular to the first plane 50 and the second plane 58, and parallel with each other.

Figure 2:
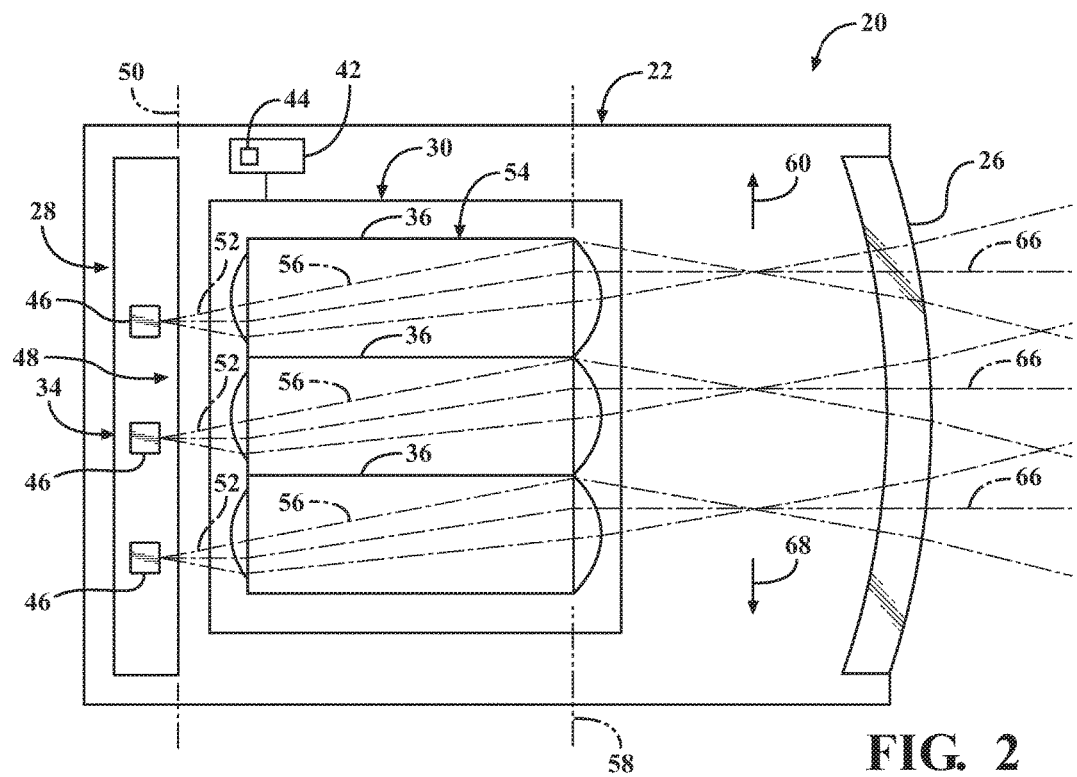
FIG. 2 is a schematic side plan view of the light emitting sensor showing the array of secondary lenses in a first offset position.

Referring to FIG. 2, the lens array 54 of secondary lenses 36 is shown in a first offset position. Each of the individual light emitters 46 is shown emitting their respective light beams 56 along their respective original paths 52, which is perpendicular to the first plane 50 and the second plane 58. The respective original paths 52 of each individual light beam 56 are parallel with each other. As shown in FIG. 2, the lens array 54 of secondary lenses 36 is offset relative to the light array 48 of individual light emitters 46 in a first direction 60, such that each of the secondary lenses 36 are no longer centered with their respective individual light emitters 46. Instead, a centerline of each of the secondary lenses 36 is offset in the first direction 60 a pre-determined distance relative to a centerline of their respective individual light emitter 46. Because the bi-telecentric secondary lenses 36 are offset in the first direction 60 relative to their respective individual light emitters 46, the original path 52 of each respective light beam 56 from each of the individual light emitters 46 is also offset in the first direction 60. As such, the individual light beams 56 enter the secondary lenses 36 along their respective original paths 52, which are perpendicular to the first plane 50 and the second plane 58 and parallel with each other. The individual light beams 56 exit the secondary lenses 36 along a respective offset path 66, which is offset in the first direction 60 relative to their respective original paths 52. The respective offset paths 66 of the individual light emitters 46 are perpendicular to the first plane 50 and the second plane 58, and parallel with each other, and are merely offset relative to their original paths 52 in the first direction 60.

Figure 3:
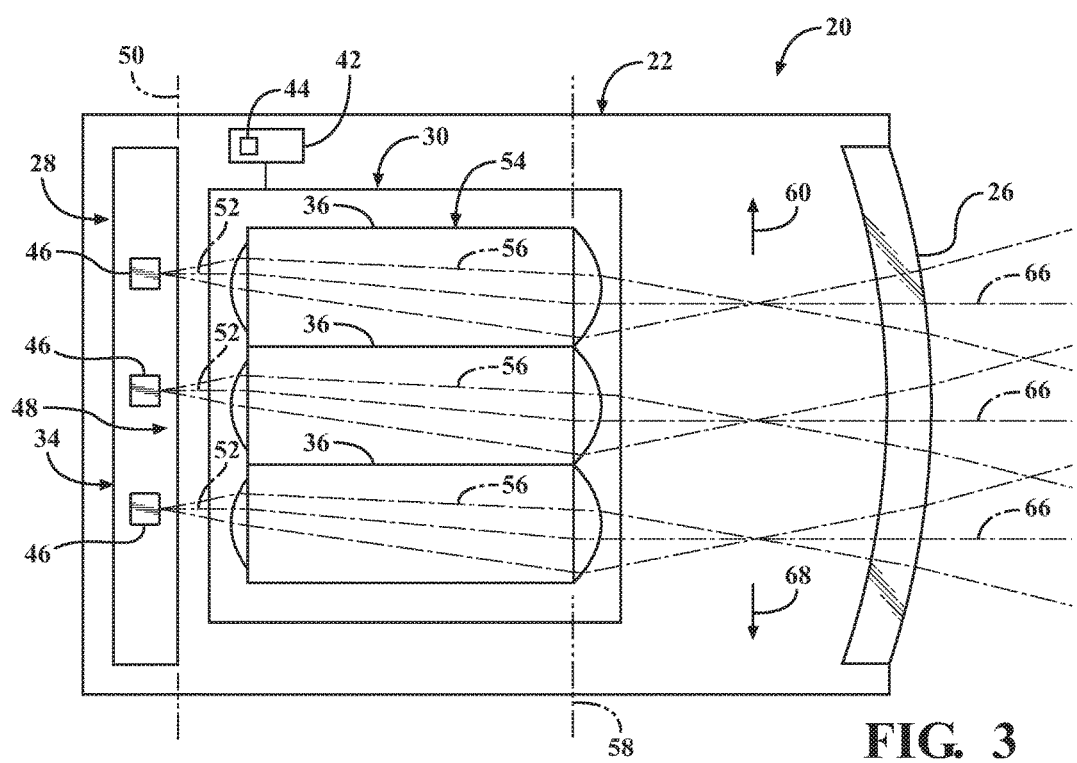
FIG. 3 is a schematic side plan view of the light emitting sensor showing the array of secondary lenses in a second offset position.

Referring to FIG. 3, the lens array 54 of secondary lenses 36 is shown in a second offset position. Each of the individual light emitters 46 is shown emitting their respective light beams 56 along their respective original paths 52, which are perpendicular to the first plane 50 and the second plane 58. The respective original paths 52 of each individual light beam 56 are parallel with each other. As shown in FIG. 3, the lens array 54 of secondary lenses 36 is offset relative to the light array 48 of individual light emitters 46 in a second direction 68, such that each of the secondary lenses 36 are no longer centered with their respective individual light emitters 46. Instead, the centerline of each of the secondary lenses 36 is offset in the second direction 68 a pre-determined distance relative to the centerline of their respective individual light emitter 46. Because the bi-telecentric secondary lenses 36 are offset in the second direction 68 relative to their respective individual light emitters 46, the original path 52 of each respective light beam 56 from each of the individual light emitters 46 is also offset in the second direction 68. As such, the individual light beams 56 enter the secondary lenses 36 along their respective original paths 52, which are perpendicular to the first plane 50 and the second plane 58 and parallel with each other. The individual light beams 56 exit the secondary lenses 36 along a respective offset path 66, which is offset in the second direction 68 relative to their respective original paths 52. The respective offset paths 66 of the individual light emitters 46 are perpendicular to the first plane 50 and the second plane 58, and parallel with each other, and are merely offset relative to their original path 52 in the second direction 68.

It should be appreciated, with reference to FIGS. 1-3, that moving the control structure 30, e.g., the lens array 54 of secondary lenses 36, adjusts or moves the position of the light beams 56 entering and exiting the primary lens 26. Scanning with the lens array 54 of secondary lenses 36 in the first offset position, the central position, and the second offset position increases the resolution of the light emitting sensor 22, by effectively providing three different paths to the primary lens 26 for each individual light beams 56, without changing the relative position between the individual light beams 56. While the exemplary embodiment of the light emitting sensor 22 is shown having a total of nine individual light emitters 46 arranged in a three by three array (shown in FIG. 4), and moveable in one dimension, e.g., the first direction 60 and the second direction 68, it should be appreciated that the light emitting sensor 22 may include any number of individual light emitters 46, and that the lens array 54 of secondary lenses 36 may move in two dimensions or three dimensions as well.

The exemplary embodiment of the light sensor 20 configured as the light detecting sensor 24 is described in greater detail below, with reference to FIG. 5. As noted above, the light device 28 of the light detecting sensor 24 includes the light detector 32. The light detector 32 is spaced from the primary lens 26, and is aligned along the first plane 50. The light detector 32 may include any suitable light detector 32. The specifics of the light detector 32 are dependent upon the intended use and application for the light detecting sensor 24.

As noted above, when the light sensor 20 is configured as the light detecting sensor 24, the control structure 30 includes a plate 38 having at least one aperture 40 extending through the plate 38. The plate 38 may be referred to herein as the aperture plate 38. The aperture plate 38 is disposed between the primary lens 26 and the light detector 32. The aperture plate 38 is aligned along the second plane 58. Preferably, the first plane 50 and the second plane 58 are positioned parallel with each other.

As noted above, the actuator 42 is coupled to the control structure 30, i.e., the aperture plate 38. The actuator 42 is operable to move the aperture plate 38 relative to the primary lens 26 and the light detector 32. The actuator 42 may move the aperture plate 38 in onedimension, e.g., an x dimension, two dimensions, e.g., an x dimension and a y dimension, or in three dimensions e.g., an x dimension, a y dimension, and a z dimension, on a Cartesian coordinate system. Moving the aperture plate 38 relative to the light detector 32 and the primary lens 26 controls the passage of light between the primary lens 26 and the light detector 32.

Accuracy of the light detecting sensor 24 is improved when extraneous light is blocked from the light detector 32, and only an intended light beam 56 is allowed to pass through to the light detector 32. The actuator 42 may be in communication with a light emitter 34, such as the light emitting sensor 22 described above. The actuator 42 is controlled to position the aperture 40 in the plate 38 relative to the light detector 32 based on a position of the light emitter 34. When the aperture 40 is properly positioned, the light beam 56 from the light emitter 34 passes through the aperture 40, while the plate 38 blocks the extraneous light 70 from the light detector 32. As such, light originating from a source other than the light emitter 34, may be blocked from the light detector 32. By knowing the position of the light emitter 34 and the direction that the light beam 56 was transmitted from the light emitter 34, the light detecting sensor 24 may determine where to position the aperture 40 to allow the light beam 56 from the light emitter 34 to pass through the aperture 40. In some embodiments, it is contemplated that the aperture plate 38 of the light detecting sensor 24 is linked or otherwise connected to the lens array 54 of secondary lenses 36 in the light emitting sensor 22 described above, and move simultaneously in a coordinated fashion to provide a high resolution scan.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A light emitting sensor comprising:
    a primary lens;
    a plurality of individual light emitters arranged in an array, with the array of the individual light emitters arranged on a first plane;
    wherein each of the plurality of individual light emitters is operable to transmit a beam of light along a path that is perpendicular to the first plane;
    a control structure having a plurality of secondary lenses arranged in an array, with the array of secondary lenses arranged on a second plane disposed between the array of individual light emitters and the primary lens, with the first plane and the second plane parallel with each other;
    wherein each of the plurality of secondary lenses is a bi-telecentric lens; and
    an actuator coupled to the control structure and operable to move the control structure relative to the primary lens and the plurality of individual light emitters to control the passage of light between the plurality of light emitters and the primary lens.

2. The light emitting sensor set forth in claim 1, wherein the control structure is moveable in three dimensions relative to the primary lens and the plurality of individual light emitters.

3. The light emitting sensor set forth in claim 1, wherein each of the plurality if individual light emitters is one of a laser, a light emitting diode, an optical fiber, an optical waveguide, or a vertical-cavity surface-emitter.

4. The light emitting sensor set forth in claim 1, wherein the actuator includes a micro electro-mechanical system (MEMS) device.

5. The light emitting sensor set forth in claim 1, wherein the actuator is one of a piezoelectric actuator, a shape memory alloy actuator, a shape memory polymer actuator, a magnetic actuator, an electronic actuator, or a hydraulic actuator.

* * * * *